Sept. 23, 1930.   G. E. LADD   1,776,472
FASTENING MEANS FOR SHEET METAL CULVERTS
Filed May 17, 1928
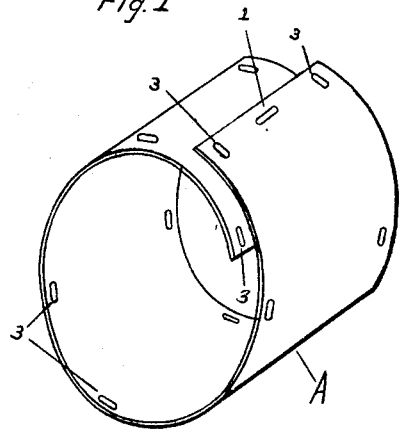
Fig. 1
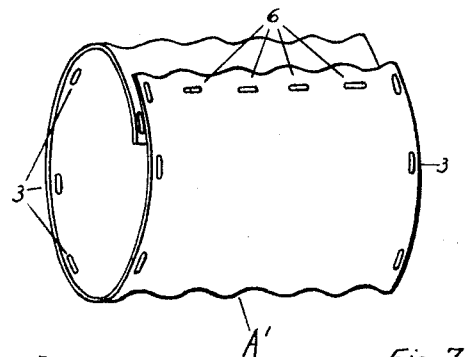
Fig. 2
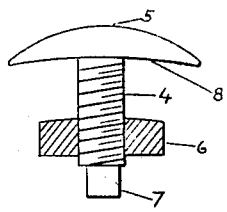
Fig. 5
Fig. 7
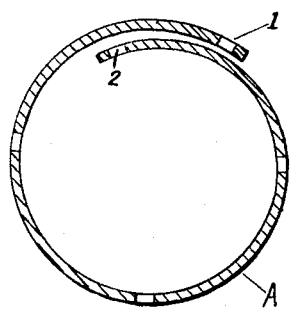
Fig. 3
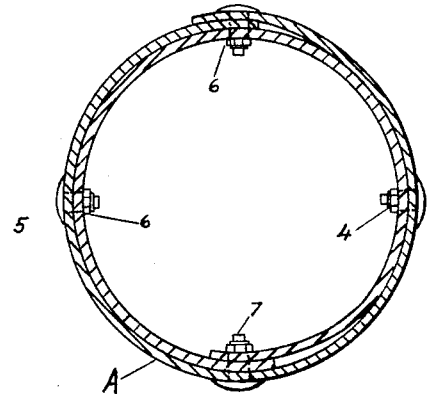
Fig. 4
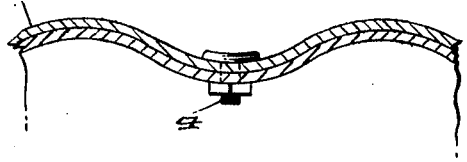
Fig. 6
INVENTOR.
George E. Ladd
BY
his ATTORNEYS.

Patented Sept. 23, 1930

1,776,472

UNITED STATES PATENT OFFICE

GEORGE E. LADD, OF WASHINGTON, DISTRICT OF COLUMBIA

FASTENING MEANS FOR SHEET-METAL CULVERTS

Application filed May 17, 1928. Serial No. 278,488.

My invention relates to an improvement in fastening means for sheet-metal culverts.

The object of this invention is to make provision for the construction of culverts underground, and to accomplish this the culvert sections are left incomplete with overlapped edges, and they are provided with slots at the edges in position to register when the culvert section is expanded to normal condition in place, whereupon a specially constructed fastening means is inserted through the slots and given a turn so that the head crosses the slots, whereupon a nut is screwed on the bolt and the culvert is permanently fastened and finished. Slots and bolts are also provided at both ends of each pipe section to fasten firmly each added section of pipe to the section behind it, as the process progresses.

In the accompanying drawings:

Fig. 1 is a view in perspective of a partially collapsed culvert section made of ordinary sheet-metal;

Fig. 2 is a similar view of a culvert section of the corrugated metal type;

Fig. 3 is a transverse section before the culvert section is expanded to normal position;

Fig. 4 is a transverse section through a joint formed by two sheet-metal culvert sections after having been expanded and bolted together;

Fig. 5 is an enlarged side elevation of a fastening bolt;

Fig. 6 is a sectional view of a modification; and

Fig. 7 is a bottom plan view of the bolt.

Referring to Fig. 1, A represents a plain sheet-metal culvert section and it is shown in an only partially expanded condition. The longitudinal edges are provided with elongated slots 1 and 2 respectively, and the opposite ends of this section are provided with slots 3 to receive fastening means such as bolts as a means for securing one section of the culvert to another.

The slots 1 and 2 at the opposite longitudinal edges are so placed that upon expanding the pipe, by the use of any ordinary expanding mechanism, these slots come together or in exact registry when the diametrical side of the culvert section has reached its normal dimension. Bolts 4, such as illustrated in Fig. 5, with elongated heads 5 and of a dimension just right to enter through these registry slots 1 and 2, are adapted to be inserted therethrough from the inside of the pipe and then given a quarter turn, after which the nuts 6 are screwed on tight and the section is completed. The slots 1 have their long axes parallel with the longitudinal axis of the culvert section and are so placed in order to prevent slippage or "play" in circumferential direction which would impair the strength of the culvert section in resisting compression from load, to improve the grip of the bolt head on curved surface of culvert, and to aid in keeping it in position. The bolts terminate in squared portions 7 at their ends by which the operator may grasp them to give them a quarter turn after having been inserted in the slots, from the inside of pipe or culvert. The nuts 6 are convex on their inner surfaces to engage the inner surfaces of the pipe sections.

In the form shown in Fig. 1, when the pipe is smooth, the slots 1 are arranged parallel with the longitudinal axis of the pipe section in order that the concave inner face 8 of the bolt-head 5 will properly fit the curved outer surface of the pipe section, after the bolt has been turned in the slots, as shown in Fig. 4; and to prevent any collapse of the culvert section after fastening is completed, as might happen through slippage if the elongated, longitudinal-edge slots were placed in a circumferential position.

The real purpose of the temporary or initial formation of the culvert section unexpanded, is to provide for passing it through a completed culvert, which is being extended, with the idea of its being expanded after reaching its position, and then being bolted to the adjacent end of the formed section of the culvert by the use of the slots 3 and the type of bolts as shown in Fig. 5, with accompanying heads, passed through slots which have been brought into registry, from the inside.

Where the culvert is made of corrugated metal, as indicated by the letter A' in Fig. 2, the slots may be on the centers of the ridges or the valleys of corrugations, or both, and the heads 5 of the bolts 4, as shown in Fig. 5, are curved to fit these ridges of the corrugations, shown in Fig. 2, just as they are to fit the general transverse curvature of the surface of the pipe made in the forms shown in Figs. 1, 2, 3 and 4. wherever slots have their longer axes parallel with longitudinal axes of corrugated culvert sections as in Figs. 1 and 2, and for similar valley slots.

Because of the curved inner faces of the bolt-heads, used for fastening through slots it is impossible for them to slip into a position, which would loosen them. Furthermore, this shape of the bolt-heads prevents them from twisting while being placed and tightened and facilitates this operation, and they do not cut or injure the galvanizing or any kind of preservative coating on the pipe.

In the modified form shown in Fig. 6, the bolts are placed between the corrugations and one curve of that portion of the culvert being different, the inner faces of the bolt-heads 5 are formed relatively convex, in one direction.

A culvert section of this general type and construction with the initial open side and the slots so placed as to insure provision in size when the edges are fastened together is easily made and is fastened together at the edges with very little difficulty, and it is possible to use such a culvert section where no other culvert section can be used unless it be of increasingly diminishing diameter, or where excessive and often a dangerous enlargement of the tunnel excavation is made in order to provide room for getting over onto one side of the culvert section in order to rivet it, and this applies only to longitudinal fastening to make each section rigid, i. e. no longer collapsible. It would not be possible to rivet the sections together around the ends, especially around the bottom half, but they can be bolted together as here described.

With this type of culvert section the diameter of the culvert when completed is uniform throughout its length, and can be extended indefinitely, each of which is a desideratum.

I claim:

1. The combination with an expansible sheet-metal culvert section having the edges thereof initially overlapped and unsecured and provided with slots in predetermined positions to come into registry when the culvert section is expanded to its normal size and diameter, of bolts having heads of a size and shape to pass through the registered slots from the inside, and means on the inside of the culvert section for securing said bolts rigidly in place.

2. The combination with an expansible sheet-metal culvert section having the edges thereof initially overlapped and unsecured and provided with slots in predetermined positions to come into registry when the culvert section is expanded to its normal size and diameter, of bolts having heads of a size and shape to pass through the registered slots, the lower sides of said heads being curved approximately to correspond with the curvature of the surface of the culvert section and extending in an axis at right-angles to the length of the slots.

3. The combination with an expansible sheet-metal culvert section having the edges thereof initially overlapped and unsecured and provided with slots in predetermined positions to come into registry when the culvert section is expanded to its normal size and diameter, of bolts having heads of a size and shape to pass through the registered slots, the lower sides of said heads being curved approximately to correspond with the curvature of the surface of the culvert section and extending in an axis at right-angles to the length of the slots, said bolts being flattened at one end protruding into the culvert section in position to be grasped to facilitate the turning of the bolts without injury.

4. The combination with an expansible sheet metal culvert section having the edges thereof initially overlapped and unsecured, and provided with slots in predetermined positions to come into registry when the culvert section is expanded to its normal size and diameter, of bolts having heads of a size and shape to pass through the registered slots from the inside of the culvert section and to be turned at right angles to said slots, said heads having the inner surfaces thereof curved approximately to correspond with the curvature of the surface of the culvert section when turned at right angles relative to the slots.

5. The combination with an expansible culvert section having the edges thereof initially overlapped and unsecured, and having slots in predetermined positions to register when the culvert section is expanded to its normal size and diameter, of bolts having heads of a size and shape to pass through the registered slots from the inside of the culvert section and to be turned across said slots, said heads having the inner surfaces thereof curved approximately to correspond with the curvature of the surface of the culvert section when turned across the slots.

In testimony whereof I affix my signature.

GEORGE E. LADD.